United States Patent

Brehler et al.

[11] Patent Number: 5,976,697
[45] Date of Patent: Nov. 2, 1999

[54] PROCESS FOR MANUFACTURING A MOLDED ARTICLE MADE OF HIGH DENSITY CARBON

[75] Inventors: Klaus-Peter Brehler, Buehl/Baden; Jens Schmidt, Ulm; Michael Scheydecker, Nersingen, all of Germany

[73] Assignee: DaimlerChrysler AG, Stuttgart, Germany

[21] Appl. No.: 08/898,037

[22] Filed: Jul. 18, 1997

[30] Foreign Application Priority Data

Jul. 18, 1996 [DE] Germany .................... 196 28 965

[51] Int. Cl.$^6$ ........................................ B32B 9/00
[52] U.S. Cl. ................. 428/408; 428/34.5; 428/36.1; 428/218; 428/402; 428/913; 428/920; 423/447.2; 423/447.4; 423/448; 423/449.1; 264/113; 264/137; 264/319
[58] Field of Search .................. 428/36.1, 34.5, 428/218, 402, 920, 913, 408; 423/448, 449.1, 447.4, 447.2, 460, 449.3; 264/137, 113, 317, 327, 115, 319

[56] References Cited

U.S. PATENT DOCUMENTS

| 4,046,863 | 9/1977 | Kobayashi et al. ............... 423/448 |
| 4,874,564 | 10/1989 | Sudani et al. .................... 264/24.7 |

FOREIGN PATENT DOCUMENTS

35 28 185  2/1986  Germany .
5-221719  of 1993  Japan .

OTHER PUBLICATIONS

R. Fujiura, et al., "Mechanical Properties of Binderless Carbon Mould Prepared from Heart–Treated . . . ", Carbon vol. 33, No. 8, pp. 1061–1068, 1995 (No Month).

*Primary Examiner*—Deborah Jones
*Assistant Examiner*—Abraham Bahta
*Attorney, Agent, or Firm*—Evenson, McKeown, Edwards & Lenahan P.L.L.C.

[57] ABSTRACT

The invention relates to a process for manufacturing an article of a high-density carbon. To produce an un-fired compact, binderless, self-sintering, fine-grained carbon powder, particularly carbon mesophases, with a powder density of more than 1 g/cm$^3$, particularly more than 1.4 m/cm$^3$, and an average grain size of between 5 and 20 $\mu$m, is precompacted at a low pressure and is pressed in a mold to at a pressure of between 50 and 150 MPa, particularly at approximately 100 MPa. After pressing, the contact pressure is slowly lowered. Then, the un-fired compact is carbonized in a temperature gradient of maximally 20 K/min. The temperature is held constant at a holding temperature of between 500 and 700° C. for a defined holding time and is subsequently raised to a maximal temperature of between 800 and 1,200° C., particularly approximately 1,000° C. Finally, the carbonized compact is graphitized at an end temperature of between 2,500–3,000° C. in an inert atmosphere, preferably a noble gas and particularly preferably argon and/or nitrogen.

16 Claims, 3 Drawing Sheets

PROCESS FOR MANUFACTURING A MOLDED ARTICLE MADE OF HIGH DENSITY CARBON

RELATED APPLICATION INFORMATION

This application claims the priority of German application 19628965.3-45, filed Jul. 18, 1996, the entire contents of which are expressly incorporated herein by reference.

BACKGROUND AND SUMMARY OF THE INVENTION

The invention relates to a method for manufacturing a molded article of high density carbon. The article can be pressed from a powder, the un-fired compact is carbonized and then graphitized.

Japanese Patent Document JP 5-221719 (A), discusses a process for manufacturing molded parts from high density carbon. The parts are close to the final desired dimension, have at least one cavity, and are particularly intended for the manufacture of pistons for internal combustion engines. For manufacturing a molded part, an un-fired compact is pressed from a sinterable powder, a powder of a high density and a grain size of an average of 15 $\mu$m. The un-fired compact is carbonized by heating to temperatures between 800° C. and 1,200° C. and is then graphitized by heating to temperatures between 2,600° C. and 3,200° C.

To form the un-fired compact, the powder is filled into a pressing mold of a pressing tool, which has a final dome-shaped die. The mold piece provided for forming the cavity in the part is made of a rigid material, particularly of metal. The pressed, un-fired compact is then removed from the pressing tool. To form the finished part, the un-fired compact is then carbonized and subsequently graphitized. To simplify removal of the un-fired compact from the pressing tool, the die has a slight conical shape, which opens up at the end the compact is removed from.

However, the molded parts produced in the manner according to the Japanese document have cracks in the edge areas. Therefore, on the edges, the parts must be made to a high over-dimension compared to the final desired dimension. Thus, in the manufacturing of the final article, increased machine work as well as time and cost expenditures are required. In addition, because of a tendency to break apart, the number of rejects produced from this process is very high, despite the over-dimension used.

To avoid this disadvantage, other documents of the art suggest using a die made of a rubber-elastic material and/or using a non-sinterable powder for producing the un-fired compact. The other working steps, such as the pressing, carbonizing and graphitizing, remain the same. The molded parts obtained by means of this process remain largely free of cracks. However, the time and energy requirement, approximately 20 days to one month for carbonizing the un-fired compact, is very high.

The present invention provides a cost effective process to manufacture articles made of a high density carbon where the manufacturing and finishing is more reasonable with respect to cost. The invention provides a method for manufacturing a high density carbon article that comprises first compacting a carbon powder into a rigid die. The carbon powder comprises a binderless, self-sintering, fine-grained carbon of a density of more than about 1 g/cm$^3$ and having an average grain size of between about 5 to about 20 $\mu$m. Preferably, the carbon content of the carbon powder is greater than about 90% by mass, the carbon powder comprises a mesophase carbon, and has a density of about 1.4 g/cm$^3$.

Generally, the compacting of the powder into a rigid die occurs at a pressure of between about 50 to about 150 MPa, preferably 100 MPa, the pressure being preferably released slowly. A precompaction step may also be included before pressing the powder into the die. The precompaction step preferably involves shaking the die but may also include uniaxially precompacting into the rigid die and subsequently isostatically pressing or cold-isostatically pressing the powder. Uniaxial compacting and isostatic pressing or cold-isostatic pressing can also be employed for the compacting process. Compacting the powder under pressure forms a compact, or an un-fired molded product.

After the compact is formed, it is subjected to a carbonizing process. Generally, carbonizing involves heating in an inert atmosphere to a temperature of between about 500 to about 700° C. Following the heating to about 500 to about 700 ° C., the temperature is raised to a maximum of between about 800 to about 1,200° C. to form a carbonized compact. The inert atmosphere can be a noble gas, such as the preferred argon, nitrogen, or any other suitable inert gas. Also, the carbonizing process preferably employs a temperature gradient to raise the temperature of the compact. That temperature gradient may be interrupted by one or more holding periods or pauses.

Following the carbonizing, the compact is graphitized. Generally, a graphitizing temperature of between about 2,000 to about 3,000° C. is used in an inert atmosphere. Again, temperature gradients, with or without pauses, may be employed.

As understood in the art, the temperature of the heating chamber will be roughly equivalent to the temperature of the compact. As used herein, the temperature of the compact can be the actual temperature of the compact, the temperature of the heating chamber, or the temperature that the heating chamber is set to.

In specific embodiments, the temperature gradients in the carbonizing step is between about 5 to about 20 K/min., especially for raising the temperature of the compact to a maximum of between about 800 to about 1,200° C. or until the compact reaches a temperature of about 150 to about 200° C., or a gradient of between about 0.05 to about 0.5 K/min., preferably 0.1 K/min.

During the graphitizing step, the heating rate of between about 0.05 to about 1 K/min. is preferably used until the compact reaches the temperature of between about 1,400 to about 1,800° C., and thereafter a heating rate of between about 2 to about 20 K/min, preferably 5 K/min., is used. Also during the graphitizing, a gradient up to a first temperature of between 1,400 and 1,800, particularly 1,600° C., at between about 0.05 and about 1 K/min., preferably approximately 0.2 K/min, is used. After reaching that first temperature, a heating rate of between about 2 to about 20, preferably about 5 K/min, is selected.

In addition, the holding period or pause in the gradients can be one where the compact is held at a temperature of between about 500 to about 700° C. for a period shorter than about two hours, or where at least one holding period occurs at approximately 1,600, 1,900, or 2,500° C. in the respective carbonizing or graphitizing steps.

Also, the carbonizing process may optionally include embedding the compact in a heat-conducting material. Various appropriate heat-conducting materials are known in the art that will not disturb the form of the article and will allow the carbonizing process to proceed. In particular, a heat-conducting material may comprise boron nitride and/or is a loose powder bulk material. In addition, the carbonized compact may optionally be cooled before the graphitizing process begins. The degree of cooling is not particularly critical.

The invention also provides articles produced from any of the methods disclosed herein. Numerous applications for high density carbon articles exist in industry. In a preferred embodiment, the article produced can be used as a component in an internal combustion engine or a crucible. In a particularly preferred embodiment, the article is designed for use as a piston in an internal combustion engine, especially an at least partially hollow piston. In such a case, and in other cases where an article having a cavity is desired, the rigid die employed comprises a mold part designed to form the cavity or hollow part of the article. The mold, generally, is comprised of a rigid metal. The invention is not limited to the use of any particular mold or the production of any particular article. However, preferred molds and considerations for the optimum design of a mold are discussed below or are available to those skilled in the art.

For example, various homogeneous, rigid, and externally polished dies, molds, and cores made of steel are known in the art. These dies can be used to form the desired interior contour of the compact, but previously lead to considerable crack formation. However, an article manufactured according to the method of the invention has a surprisingly negligible amount of cracks and likewise negligible bubbles. For this reason, the dimensions of the articles manufactured, particularly on the edges, can better approach the desired finished dimensions. The reduced deviation of the molded article from the final, desired dimensions results in a shorter machining time and therefore lower cost. In addition, it is surprising that as a result of the invention, the time for carbonizing the pressed un-fired compact can be reduced to approximately 5 days. Thus, the energy consumption and also the costs for manufacturing the article can be dramatically reduced.

Generally, the invention involves pressing binderless, small-grained carbon powders into a non-elastic die and a subsequent temperature treatment, to produce an isotropic article of a high-strength graphite, which is close to the final desired form. Various degrees of closeness to the final desired form may be possible. However, the invention reduces the time-consuming and cost-intensive finishing operations required of prior methods. A suitable powder selection, shaping, and implementation of the process permit the manufacture of homogeneous, crack-free and bubble-free components made of graphite. Thus, depending on the component desired, various permutations in the carbon powders, mold, temperatures used in the steps of the method can be employed by those skilled in the art. Some examples are described below or can be taken from the German priority document. However, the invention is not limited to any particular examples.

Other objects, advantages and novel features of the present invention will become apparent from the following detailed description of the invention when considered in conjunction with the accompanying drawings.

Although the invention has been described and illustrated in detail, it is to be clearly understood that the same is by way of illustration and example, and is not to be taken by way of limitation. The spirit and scope of the present invention are to be limited only by the terms of the appended claims.

As the staring material, binderless, fine-grained carbon powders, particularly carbon mesophases of a powder density of more than 1.4 g/cm$^3$, are used. The powder is self-sintering and is processed without any additional additives or binding agents. The average grain sizes of the powders used are between 5 and 20 $\mu$m. In addition, powders of high carbon contents of approximately 90% by weight are suitable because they result in a high carbon yield after carbonizing.

Pressing the un-fired compact close to the final form may take place either in a cold isostatic press or in a uniaxial press. The cold-isostatic forming tool used, into which the powder is filled, consists of a unvulcanized rubber-type material, such as silicon rubber or a PU-foam material, with a wall thickness of between 5 and 15 mm. A die made of a rigid, non-elastic material is added to the center of these cylindrical forms in that the die is slightly sunk into the bottom of the rubber-type form and cannot slip when the form tool is filled with powder and during the pressing. The die used here results in a cavity in the final product. So that the wall thickness of the un-fired compact to be pressed is approximately the same everywhere, the shape of the forming tool is constructed to be approximately equidistant to the wall of the die.

An advantageous design of the die was found to be a slightly conical shape because, by means of the pressing operation, the powder is pressed onto the die and adheres slightly. Using even a slight conical form or slope in the die significantly simplifies the removal of the un-fired compact after the pressing. This applies particularly to dies which have no rotational symmetry.

The powder is filled into the remaining cavity between the die and the rubber-type form and is slightly compressed manually or by shaking in order to achieve a good filling ratio. The filled mold is closed by means of a lid, which also consists of a rubber-type material, and has the same wall thickness as the rest of the forming tool.

During cold isostatic pressing, the pressure used, as a function of the grain size and of the density of the powder used, is between 50 and 150 MPa. The maximal pressure is maintained for up to 10 minutes.

During the pressing process, it is advantageous to control the pressure reduction from approximately 8 MPa to the normal pressure in order to avoid pressing tensions in the component. During the pressing, the die remains in the center of the rubber-type form filled with powder and is also pressed and supplies a true-to-form interior contour of the cavity. By means of this operation, a clean and smooth contour and interior surface of the pressed compact is obtained. In contrast, in the case of the cold isostatic pressing, the exterior walls of the pressed un-fired compact are slightly curved because, during the pressing onto the non-deformable core, the powder flows plastically into the corners of the rubber-type form where the pressing forces acting upon the form are not so strong.

In order to also construct the outer contour close to the final form and for industrial scale applications, it is advantageous to press the un-fired compact uniaxially. In the case of a uniaxial pressing in a rigid cylinder and when a rigid core is used, not only the interior contour but also the exterior contour can be produced close to the final shape. The wall surfaces produced are smooth, which completely eliminates exterior finishing of the component.

The contact pressure is very dependent on the desired component and is higher than 1 MPa. The pressing mold consists of a metal, such as aluminum, whose surface is coated with a hard material and/or anodized. It may be required to isostatically recompact the uniaxial compacts, for example, by welding and evacuating in a plastic foil. As a result, the exterior contour and the interior contour will change very little, if at all. The un-fired compacts so far produced according to the method of the invention have bottom and wall thicknesses of more than 5 mm.

For the carbonizing, it is advantageous for the un-fired compact to be charged into a crucible, which contains a heat-conducting material, such as boron nitride. The un-fired compact is embedded completely in the loose powder bulk of the heat-conducting material. During the temperature treatment, the material surrounding the mold-part must not react with the product, must not adhere, and must itself not be sinterable. Also, it must be easily removable after the carbonizing.

The temperature treatment is carried out in an inert gas atmosphere, for example, under nitrogen. Up to a temperature of approximately 200° C., a fast heating rate of approximately 10 K/min. can be used. Starting at 200° C., the first compacting step and shrinkage process in the pressed un-fired compact will start. In this case, a slow heating rate of approximately 0.1 K/min. will preferably be selected. In the temperature range between 500 and 700° C., an intermediate holding time expediently takes place so that the material will have time for the chemical reactions to occur and the pyrolysis gas to be released to diffuse to the component surface. Subsequently, a faster heating rate of approximately 0.2 K/min. is used up to the end temperature of 1,000° C. The whole process time amounts to, for example, approximately 4 days.

After the carbonizing, a compact, crack-free body is obtained which, in comparison to the un-fired condition, has shrunk by approximately 30% in volume. The compact carbonized crucible form consists of a partially crystalline, partially graphitized carbon material and is hard and brittle in this condition. The structure of the carbonized compact is homogeneous. The interior contours, which are caused by the pressing operation of the die or onto the core, are obtained in a true-to-size manner.

For the graphitizing process, it is not absolutely necessary to burn the carbonized crucible in a powder bed. The graphitizing of the carbonized un-fired compacts takes place in an inert atmosphere; for example, using argon, and is conducted at temperatures of from 2,000 to 3,000° C., particularly above 2,500° C. The carbonized un-fired compact is taken out of the carbonizing furnace, and, in the cooled condition, is charged into a graphitizing furnace. As a result, contaminations are avoided during the subsequent graphitizing because contamination degassing from the un-fired compact during the carbonizing will remain in the carbonizing furnace. The graphitizing furnace is heated to approximately 1,000° C. with a temperature gradient of approximately 10 K/min. At temperatures of between 1,000° C. and approximately 1,600° C., a heating rate of approximately 0.2° K./min. is selected. Up to the desired graphitizing temperature, heating rates of up to 5 K/min. can be used. Advantageously, pauses are made at temperatures of 1,600, 1,900, and 2,500° C., which are used for improving time-dependent diffusion within the interior of the component, which is advantageous for achieving good material properties of the end product.

During the graphitizing, mainly compacting processes occur in the body volume. In addition, the crystallinity of the carbons will rise considerably and it becomes increasingly graphitic in its properties.

An article produced by means of the method according to the invention is crack-free and homogeneous. The molded part has a homogeneous fine-grained structure and therefore has excellent physical and mechanical properties for a graphite. The surfaces which faced the core during the pressing are smooth. The volume shrinkage with respect to the un-fired compact is 40–50% by volume.

DETAILED DESCRIPTION OF THE DRAWINGS AND SPECIFIC EMBODIMENTS OF THE INVENTION

Figure 1:
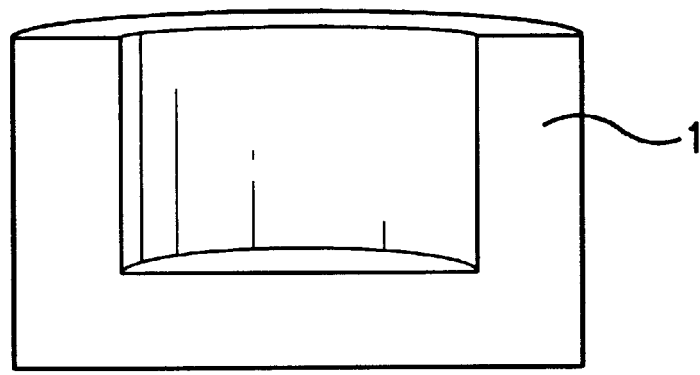
FIG. 1 is a sectional view of a molded part for the subsequent manufacturing of a graphite piston for an internal combustion engine.

As a possible end product of the claimed process according to the invention, FIG. 1 shows a molded part 1 with a crucible-shaped cross-section, particularly for a piston made of graphite for use in an internal combustion engine. So that the finishing of the piston can be carried out with relatively low time expenditures, the molded part 1 is produced to be close to the final shape. "Close to the final shape" in this context means that, with respect to the later final shape of the piston, the interior shape of the molded part 1 has tolerances of less than one centimeter, particularly tolerances of less than half to a quarter of a centimeter.

In the case of a molded part 1 for final products having different wall thicknesses, the un-fired compact 2 is preferably pressed with a constant wall thickness, the tolerances indicated here referring to the largest wall thickness.

Figure 2:
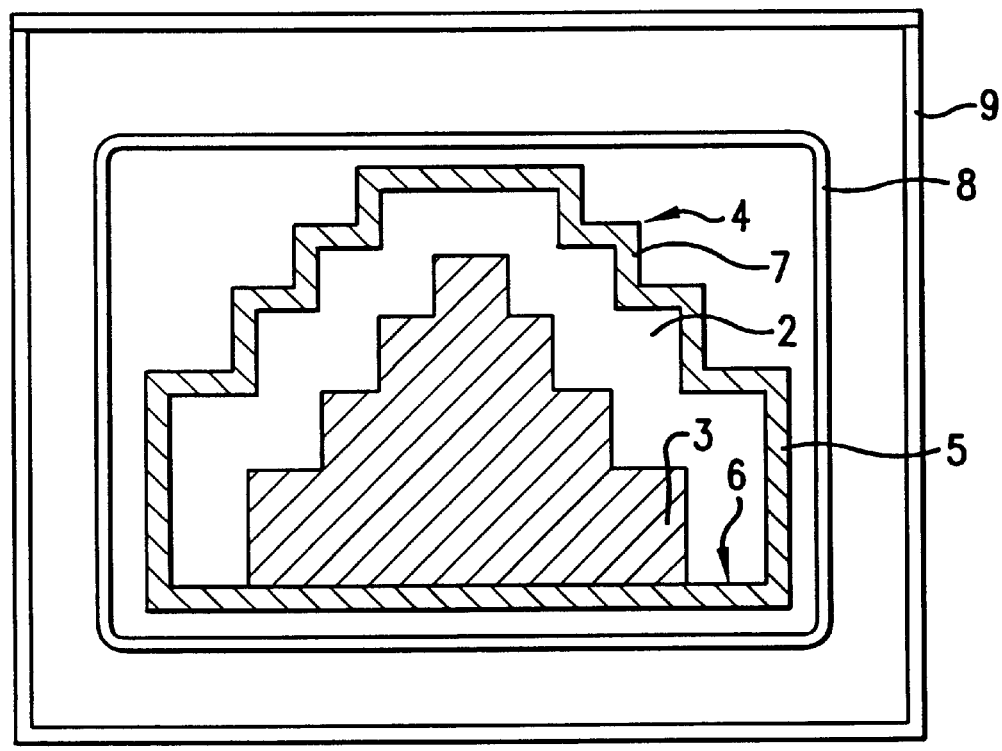
FIG. 2 is a sectional view of a pressing tool for producing an un-fired compact arranged on the interior side and having a stepped cross-section.

FIG. 2 is a sectional view of a pressing tool 4 for manufacturing an un-fired compact 2 for another molded part. In contrast to a un-fired compact for a molded part 1 according to FIG. 1, the un-fired compact according to FIG. 2, in its longitudinal sectional view, has no linear course of the wall but a stepped course of the wall.

So that an un-fired compact can be carbonized and graphitized to a low rejection rate, despite the stepped construction, its walls always have an almost uniform wall thickness. This is advantageous because, as a result—as described later—during the carbonizing and during the graphitizing, the area of the wall in each case has almost identical degassing and diffusion paths.

The pressing tool 4 has a pressing pot 5 with an outer contour and a bottom 6 made of an elastic material. On the bottom 6 of the press pot 5, for forming the cavity of the green compact 2, a die or core 3 made of a rigid or inelastic material is arranged in a defined stationary manner.

For forming a stepped course of the wall of the un-fired compact 2 to be pressed, the die 3 has a correspondingly stepped wall dimension, in which case the edges are chamfered and/or have roundings (not shown). For the simplified removal of the die 3 or of the pressed un-fired compact 2, the die 3, in addition, has a removal slope or conical shape along its walls.

So that the thickness of the wall of the pressed un-fired compact 2 advantageously remains approximately the same, the outer contour of the press pot 5 advantageously has an approximately constant distance with respect to the wall of the die 3.

After the filling of the press pot 5 with powder, the press pot 5 is closed by means of a press lid 7, which is also made of an elastic. Optionally, instead of being arranged on the bottom 6 of the press pot 5, the die 3 may also be arranged on the press lid 7, which, in the case of the un-fired compact 2 according to FIG. 2, may be more advantageous.

The press pot 5 closed by means of the press lid 7—thus the pressing tool 4—is sealingly enclosed in a flexible and preferably elastic covering 8 and placed in a liquid basin 9 whose pressure is increased. In this case, in a quasi-isostatic pressing operation, the powder is pressed onto the free rigid walls of the die 3, whereby the un-fired compact 2 is formed with an approximately constant wall thickness. Quasi-isostatic means that only the contact pressure from the outside is isostatic. In the following, the manufacturing of a crucible-type molded part 1 according to FIG. 1 is described.

As the starting substance for the production of a crucible-type un-fired compact, a carbon mesophase powder with a C/H-ratio of 2.3, a powder density of 1.43 g/cm$^3$ and a median grain size of 9 μm (maximal grain size 25 μm) is used.

First, the powder is filled into a press pot 5, cylindrical in this case, of a pressing tool 4 which has a cylindrical die 3 made of steel in its center which is fixed on the bottom 6 of the press pot 5. The interior diameter of the press pot 5 is 150 mm; the filling level is 80 mm, at a wall thickness of 8 mm. The die 3 has a diameter of 89 mm and a height of 53 mm. The volume of 1,084 cm$^3$ remaining between the die 3 and the interior wall of the press pot 5 is filled with 680 g of powder. During the filling and the later pressing, care should be taken that the die 3 does not slip. After the filling, the press pot 5 is precompacted by shaking. After the precompacting, the press pot 5 is closed by means of a press lid 7 made of rubber-type material and is enclosed in a tight rubber foil forming the covering 8.

Figure 3:
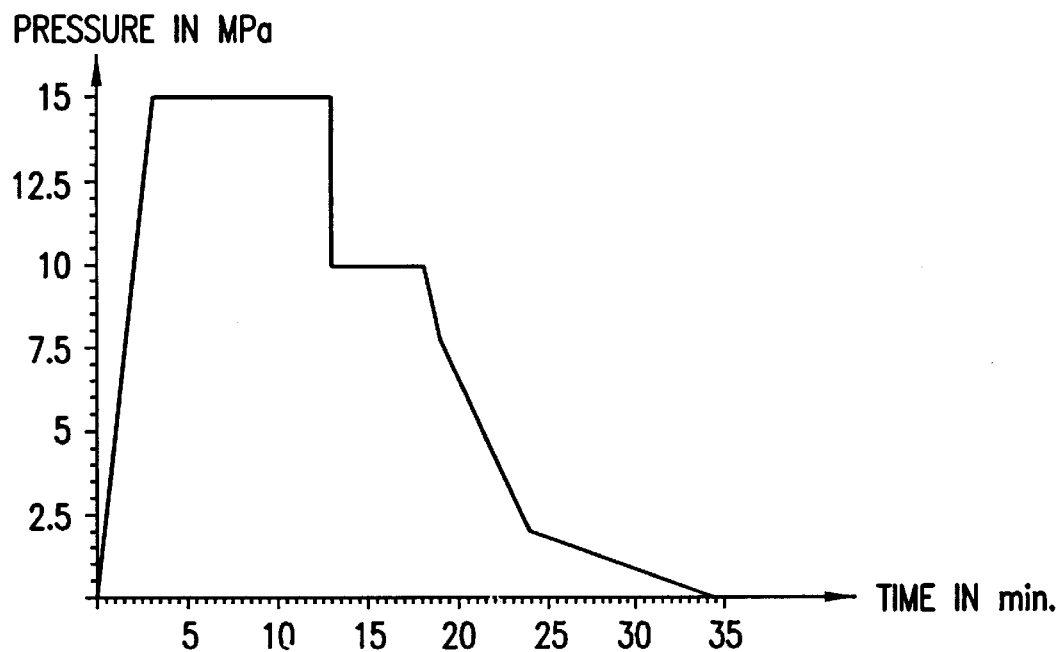
FIG. 3 is a view of a time-dependent pressure course for pressing an un-fired compact for a molded part according to FIG. 1.

The powder, which was charged into the pressing tool 4 in this manner, is cold-isostatically exposed for a duration of 10 minutes to a contact pressure of 15 MPa and is compacted to a firm un-fired compact, the pressure being applied within 3 minutes. Subsequently, the contact pressure is lowered to 10 MPa and this pressure is maintained for 5 minutes. Subsequently, the contact pressure is lowered again, between 8 MPa and 2 MPa, a pressure slope of 6 MPa/5 minutes being applied. From 2 Mpa to the normal pressure, the pressure relief takes 10 minutes. The density of the un-fired compact is 1.24 g/cm$^3$. After the pressing of the un-fired compact, the contact pressure is slowly lowered from a pressure of 8 MPa, in which case, at a contact pressure of 2 MPa, the pressure reduction is slowed down again. The whole pressure course during the pressing of the un-fired compact is shown in FIG. 3 true to scale.

To prepare the carbonizing process, the un-fired compact is placed in a closed crucible made of graphite. The crucible contains a fine-grained, loose bulk of boron nitride (powder bed) in which the un-fired compact is embedded.

Figure 4:
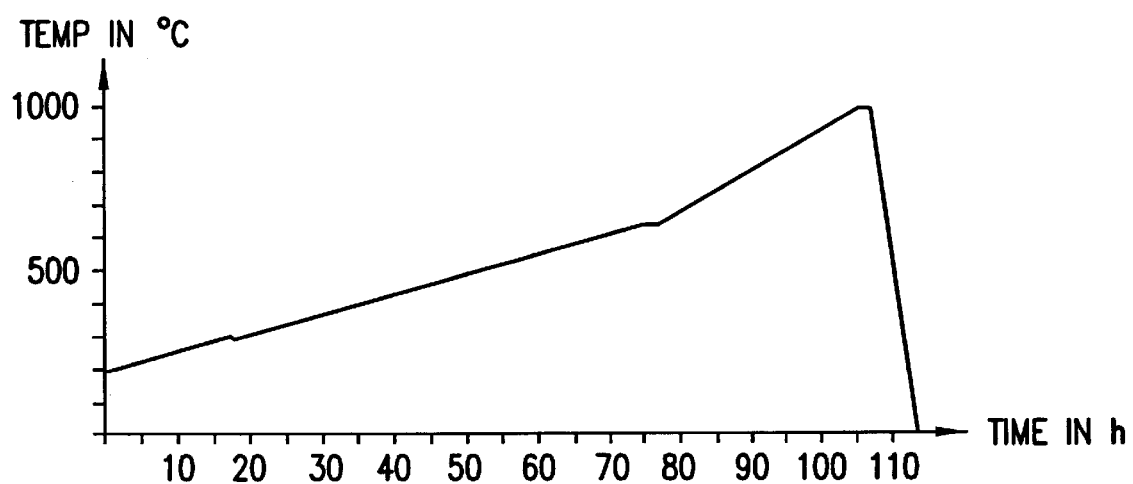
FIG. 4 is a time-related temperature course for carbonizing the un-fired compact for a mold-part according to FIG. 1.

Carbonization is carried out in a nitrogen atmosphere in a resistance-heated furnace to an end temperature of 1,000° C. The process is carried out in an inert atmosphere with a flow rate of the gas of 1 liter/min. at a furnace content of 75 liters. The indicated process is carried out in 9 steps and lasts 4 days, 18 hours and 18 minutes. The temperature control of the process is illustrated in Table 1 and in the schematic diagram of FIG. 4.

TABLE 1

Temperature Control for the Carbonizing Process

| Segment No. | Heating/Cooling Rate [K/min] | Temperature Start [° C.] | Temperature End [° C.] | Holding Time [min] |
|---|---|---|---|---|
| 1 | 10 | 20 | 200 | — |
| 2 | 0.1 | 200 | 300 | — |
| 3 | — | 300 | 300 | 60 |
| 4 | 0.1 | 300 | 650 | — |
| 5 | — | 650 | 650 | 60 |
| 6 | 0.2 | 650 | 1,000 | — |
| 7 | — | 1,000 | 1,000 | 60 |
| 8 | 2 | 1,000 | 500 | — |
| 9 | 3 | 500 | 20 | — |

After carbonizing, a homogeneous and crack-free solid body is obtained as a carbonized compact, thus as a carbon body, which has the following approximate dimensions: inside diameter 78 mm; outside diameter 112 mm; height outside 55 mm; and height inside 42 mm. The density of the carbonized compact is 1.71 g/cm$^3$.

The graphitizing process is carried out in a 15 liter graphitizing furnace in an argon atmosphere to a final temperature of 2,500° C. The flow rate of the inert gas is 1 liter/min. as during the carbonizing. The total time of the graphitizing process is 3 days, 10 hours and 36 minutes. The final temperature to be presented during the graphitizing, among other things, depends on the powder used.

Figure 5:
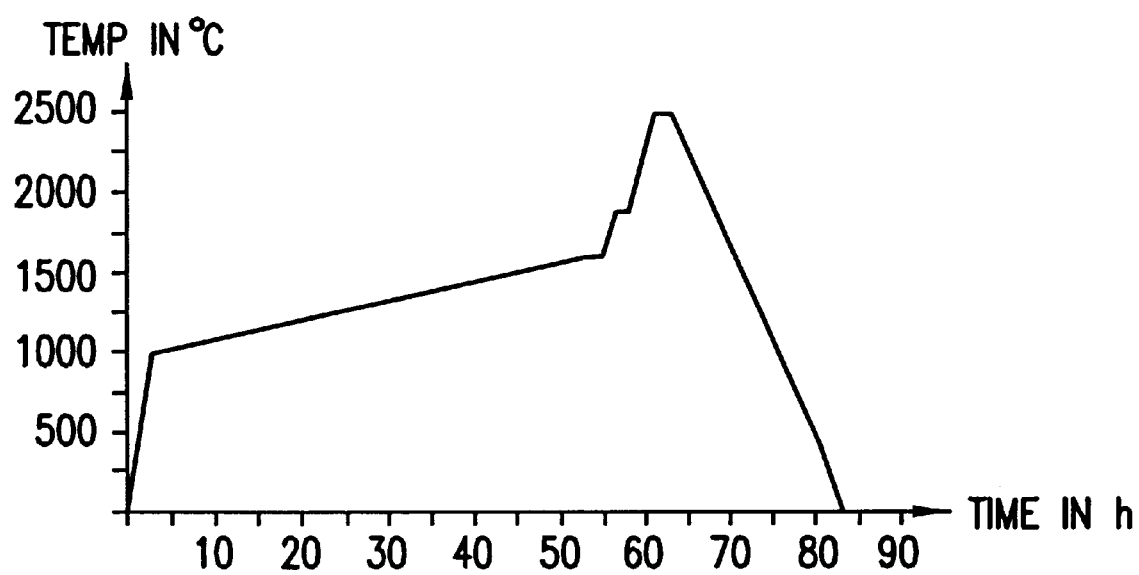
FIG. 5 is a view of a time-related temperature course for graphitizing the un-fired compact for manufacturing a molded part according to FIG. 1.

Temperature control is carried out in 9 segments and is illustrated schematically in Table 2 and in FIG. 5. After the graphitizing, a homogenous, crack-free molded part is obtained which has the following approximate dimensions: inside diameter 75 mm; outside diameter 106 mm; outside height 52 mm; and inside height 40 mm.

TABLE 2

Temperature Control for the Graphitizing Process

| Segment No. | Heating/Cooling Rate [K/min] | Temperature Start [° C.] | Temperature End [° C.] | Holding Time [min] |
|---|---|---|---|---|
| 1 | 5 | 20 | 1,000 | — |
| 2 | 0.2 | 1,000 | 1,600 | — |
| 3 | — | 1,600 | 1,600 | 120 |
| 4 | 2.5 | 1,600 | 1,900 | — |
| 5 | — | 1,900 | 1,900 | 120 |
| 6 | 5 | 1,900 | 2,500 | — |
| 7 | — | 2,500 | 2,500 | 120 |
| 8 | 2 | 2,500 | 500 | — |
| 9 | 3 | 500 | 20 | — |

The graphitized solid body is characterized by the mechanical-physical properties described below.

The density, which was determined according to Archimedes' method, buoyancy in water, amounts to 1.94+/−, 0.01 g/cm$^3$, corresponding to 86% of the theoretical density of graphite.

The open porosity, which was determined by means of a helium pyknometer, amounts to 11% by volume.

For determining the flexural strength (4-point method), 20 samples were taken from the bottom and the wall of the cylindrical body having a dimension of 45×4×3 mm. The samples taken from the bottom exhibited a peak value of flexural strength of 116 MPa and a minimal value of 91

MPa. The arithmetical mean value is 107 Mpa. The wall exhibits a peak flexural strength value of 105 MPa and a minimal value of 90 MPa. The arithmetical mean value is 96 MPa.

The value for the interplanar spacing c/2, which was determined by X-ray diffractometry, is 0.336+/−0.001 nm.

The thermal conductibility was determined on a cylindrical (wall) sample of the dimensions 20 mm in length and 8 mm in diameter, according to the laser flash method, as 105 W/(m●K); that of a bottom sample 109 W/(m●K).

The hardness value, which was determined according to the Rockwell Method (HR), is 76.

TABLE 3

Dimensions and Shrinkages of the Un-fired Compact, of the Carbonized Body and of the Graphitized Body

|  | Compact Size | Body Carbonized 1,000° C. | Shrinkage | Body Graphitized 2,500° C. | Shrinkage |
| --- | --- | --- | --- | --- | --- |
| ø inside in mm | 89 | 78.2 | −12.1 length % | 75.3 | −15.4 length % |
| ø outside in mm | 127.4 | 111.5 | −12.5 length % | 106.2 | −16.6 length % |
| Height inside in mm | 47 | 41.9 | −10.9 length % | 39.5 | −16.0 length % |
| Height outside in mm | 62 | 55.1 | −11.1 length % | 51.5 | −16.9 length % |
| Total Vol. in cm$^3$ | 497.9 | 336.8 | −32.4 % by vol. | 280.3 | −43.7 % by vol. |
| Mass in g | 680 | 616.8 | −9.3 % by mass | 605.9 | −10.9 % by mass |

A molded part manufactured according to the process of the invention, is close to the desired contour and has properties comparable to the high-strength graphites commercially available. By the data as shown in Table 3, one skilled in the art can calculate the appropriate total shrinkage for any particular method desired. Thus, the final dimensions of the desired article can be appropriately designed and optimized.

By means of the combination of typical graphitic properties, such as high strength, low specific weight, and high thermal conductibility, a wide application spectrum for products made from the method of the invention is possible. The graphite produced is insoluble in $H_2O$ and non-oxidizing by acids and bases; it is not meltable and chemically inert with respect to almost all types of organic chemicals, such a lacquers, paints, antifreezes, refrigerating agents or plastics and technical resins. The graphite produced also exhibits the highest resistance to inorganic materials, such as bases and most acids. Thus, the graphite produced can be used as a crucible material, for example, in the growing of crystals. Temperatures >500° C. in an oxidizing atmosphere as well as the incompatibility of the graphite with respect to extremely oxidizing media limit the range of application.

In particular, because of its high flexural strength of approximately >90 MPa, the graphite produced according to the invention has the advantage that it is suitable for use as a mechanically stressed component. The amount of the measured values, their homogeneity over the whole molded part 1 and their low spreading is especially advantageous for use as graphite pistons in internal combustion engines.

In addition, uses other for components requiring narrow tolerances and installation plays under normal conditions as well as at raised temperatures are considered. For this application, in the case of which the material heats up, for example, by means of frictional stress, the high thermal conductibility of approximately 100 W/(m●K) (steel 30 (W/m●K)) also has a very positive effect. It provides a sufficient conductance of heat and protects the graphite from oxidation. Because of its low density of approximately 1.94 g/cm$^3$ in comparison to metals, a use as a light weight material is possible.

We claim:

1. A method for manufacturing a high density carbon article, comprising:
   (1) shaking a carbon powder comprising a binderless, self-sintering, fine-grained carbon of a density of more than about 1 g/cm$^3$ and having an average grain size of between 5 to 20 µm into a rigid die to precompact the carbon powder;
   (2) compacting the carbon powder at a pressure of between about 50 to about 150 MPa to form a compact;
   (3) lowering the pressure at a rate between 0.19 and 1.2 MPa/min;
   (4) heating the compact in an inert atmosphere where the compact is brought to a temperature of between about 500 to about 700° C. at a heating rate between 5 and 20 K/min and is held at said temperature for a period shorter than about 2 hours;
   (5) raising the temperature of the compact to a maximum of between about 800 to about 1,200° C. at a heating rate of 0.05 to 0.5 K/min to form a carbonized compact; and
   (6) graphitizing the carbonized compact at a temperature of between about 2,000 to about 3,000° C. in an inert atmosphere,
   wherein at least one holding period occurs at approximately 1600, 1900 or 2500° C.

2. A method as claimed in claim 1, wherein the carbon powder comprises a mesophase carbon.

3. A method as claimed in claim 1, wherein the carbon powder comprises a carbon of more than about 1.4 g/cm$^3$.

4. A method as claimed in claim 1, wherein at least one of step (4) or (5) further comprise embedding the compact in a heat-conducting material.

5. A method as claimed in claim 4, wherein the heat-conducting material comprises boron nitride.

6. A method as claimed in claim 1, wherein the carbon powder comprises more than about 90% carbon by mass.

7. A method as claimed in claim 1, wherein the heating of the compact in step (4) further comprises employing a heating rate of between about 5 to about 20 K/min until the compact reaches a temperature of about 150 to about 200° C.

8. A method as claimed in claim 1, wherein at least one holding period occurs during the graphitizing step (6), wherein the temperature does not substantially increase.

9. A method as claimed in claim 1, wherein during the graphitizing step (6) the heating rate of between about 0.05 to about 1 K/min. is used until the compact reaches the temperature of between about 1,400 to about 1,800° C., and thereafter a heating rate of between about 2 to about 20 K/min is used.

10. A method as claimed in claim 1, wherein the carbonized compact is cooled before graphitizing.

11. A method as claimed in claim 1, wherein the rigid die forms a compact having a cavity.

12. A method as claimed in claim 1, wherein the carbon powder is uniaxially precompacted into the rigid die and is subsequently isostatically pressed.

13. A method as claimed in claim 12, wherein the subsequent isostatic pressing is a cold isostatic pressing.

14. An article produced by a method as claimed in claim 1.

15. An article as claimed in claim 13, that comprises a component for an internal combustion engine.

16. An article as claimed in claim 14, that comprises a piston.

* * * * *